(12) United States Patent
Johansson (10) Patent No.: US 12,528,323 B2
(45) Date of Patent: Jan. 20, 2026

(54) FOUR POINT LINK SUSPENSION FOR A VEHICLE, A VEHICLE COMPRISING THE SAME

(71) Applicant: Traton AB, Södertälje (SE)

(72) Inventor: Anders Johansson, Älvsjö (SE)

(73) Assignee: Traton AB, Södertälje (SE)

( * ) Notice: Subject to any disclaimer, the term of this patent is extended or adjusted under 35 U.S.C. 154(b) by 0 days.

(21) Appl. No.: 18/717,044

(22) PCT Filed: Dec. 2, 2022

(86) PCT No.: PCT/SE2022/051134
§ 371 (c)(1),
(2) Date: Jun. 6, 2024

(87) PCT Pub. No.: WO2023/113673
PCT Pub. Date: Jun. 22, 2023

(65) Prior Publication Data
US 2025/0033426 A1    Jan. 30, 2025

(30) Foreign Application Priority Data

Dec. 14, 2021   (EP) ..................... 21214429

(51) Int. Cl.
*B60G 9/02*   (2006.01)
*B60G 11/64*  (2006.01)

(52) U.S. Cl.
CPC ............... *B60G 9/02* (2013.01); *B60G 11/64* (2013.01); *B60G 2200/34* (2013.01);
(Continued)

(58) Field of Classification Search
CPC ...... B60G 2204/126; B60G 2204/1226; B60G 2202/152; B60G 2202/134; B60G 2200/34; B60G 9/02; B60G 11/64
See application file for complete search history.

(56) References Cited

U.S. PATENT DOCUMENTS

| RE33,630 E * | 7/1991 | Griffin, Sr. ............. | B60G 9/003 280/124.162 |
| 5,286,044 A * | 2/1994 | Satzler ................... | B60G 11/22 180/9.1 |

(Continued)

FOREIGN PATENT DOCUMENTS

DE         10334156 A1   2/2005
DE     102006045861 A1   4/2008
(Continued)

OTHER PUBLICATIONS

WO_2010132692_A1 machine translation from FIT (Year: 2024).*
(Continued)

*Primary Examiner* — Paul N Dickson
*Assistant Examiner* — Maxwell L Meshaka
(74) *Attorney, Agent, or Firm* — Moore & Van Allen PLLC; W. Kevin Ransom (57) ABSTRACT

A four point link suspension for a vehicle, wherein the suspension comprises: a first side suspension spring, configured to absorb a vertical load; a second side suspension spring, configured to absorb the vertical load, wherein the springs are configured to be connected to a vehicle frame via a respective joint; a stabilization frame, comprising a first side link arm having a first ending and a second ending connected to the first side suspension spring via a second joint; a second side link arm and a second ending connected to the second side suspension spring via a second joint; and a torsion bar, connecting the side link arms, which side link arms are tapered towards the respective first ending.

24 Claims, 8 Drawing Sheets

(52) U.S. Cl.
CPC ............... *B60G 2202/134* (2013.01); *B60G 2202/152* (2013.01); *B60G 2204/1226* (2013.01); *B60G 2204/126* (2013.01)

(56) References Cited

U.S. PATENT DOCUMENTS

| | | | | |
|---|---|---|---|---|
| 5,988,672 | A * | 11/1999 | VanDenberg | B60G 11/64 280/683 |
| 7,543,833 | B2 * | 6/2009 | Lundmark | B62D 7/20 280/124.13 |
| 8,857,835 | B2 * | 10/2014 | Lee | B60G 21/051 280/124.157 |
| 2003/0141757 | A1 * | 7/2003 | Deletombe | B60G 21/051 301/127 |
| 2005/0073124 | A1 * | 4/2005 | Lundmark | B62D 7/20 280/124.13 |
| 2010/0025953 | A1 * | 2/2010 | Buhl | B60G 9/02 280/124.153 |
| 2010/0044988 | A1 * | 2/2010 | Rochester | B60G 7/001 280/124.116 |
| 2014/0125025 | A1 * | 5/2014 | Lee | B60G 21/051 280/124.1 |

FOREIGN PATENT DOCUMENTS

| | | |
|---|---|---|
| EP | 933241 A2 | 8/1999 |
| EP | 940322 A1 | 9/1999 |
| EP | 2946944 A1 | 11/2015 |
| FR | 3052394 A1 * | 12/2017 |
| JP | 2001270314 A | 10/2001 |
| WO | 0012330 A1 | 3/2000 |
| WO | 2010132692 A1 | 11/2010 |
| WO | 2013018585 A1 | 2/2013 |

OTHER PUBLICATIONS

WO_0012330_A1 machine translation from FIT (Year: 2024).*
JP_2001270314_A machine translation from FIT (Year: 2024).*
Scania CV AB, International Patent Application No. PCT/SE2022/051134, International Search Report, Mar. 3, 2023.
Scania CV AB, International Patent Application No. PCT/SE2022/051134, Written Opinion, Mar. 3, 2023.
Scania CV AB, European Patent Application No. 21214429.9, Extended European Search Report, May 19, 2022.

* cited by examiner

FOUR POINT LINK SUSPENSION FOR A VEHICLE, A VEHICLE COMPRISING THE SAME

CROSS-REFERENCE TO RELATED APPLICATIONS

This application is a National Stage Patent Application (filed under 35 § U.S.C. 371) of PCT/SE2022/051134, filed Dec. 2, 2022, of the same title, which, in turn claims priority to EP Patent Application No. 21214429.9 filed Dec. 14, 2021, of the same title; the contents of each of which are hereby incorporated by reference.

TECHNICAL FIELD

This document discloses a four point link suspension for a vehicle, sometimes referred to as a parallelogram wheel suspension. A vehicle is also described, comprising the four point link suspension.

BACKGROUND

A common rear air suspension type utilized in vehicles is a parallelogram suspension with four air springs. Typically, two air springs are positioned in front of the rear wheel axle and two air springs positioned in rear of the wheel axle. This arrangement is sometimes referred to as a 4-bellow suspension unit.

The bellow suspension unit substantially defines the shape of a parallelogram to control and stabilize the axle. Due to this arrangement, the caster of the axle can remain virtually constant as the axle moves vertically with respect to the chassis.

Often these types of 4-bellow suspension units have a v-rod with a central position at the top of the rear axle and inside of the chassis frame side members in connection with (or in close connection with) via a cross-member placed at the frame outside mounted rod brackets.

Usually, an anti-roll bar function is either integrated into the lower torque rods or separately with an anti-roll bar apart from the rod brackets. There may also be provided anti-roll bar or stabilizer solutions which are integrated in an X or H shape type of rod and are placed in the same way in the chassis as a v-rod.

An anti-roll bar is configured to only handle rolling loads while a stabilizer rod, which also may be referred to as a stabilink or stabilenkers, are configured to handle rolling loads as well as longitudinal loads and lateral loads.

When combining this suspension type with an e-axle design, which has its drive unit directly mounted on the front part of the axle, it is problematic to get it to fit between the front air springs. Particularly when considering dynamic movements of the rear axle.

The e-axle, or e-drive, combines an electric vehicle's gear, motor, and power-control electronics in one compact unit at the axle of battery-electric vehicles/hybrid vehicles.

There are solutions on the market that uses a parallelogram rear air suspension (non-reactive suspension) described above, but with a design that uses two rear mounted air springs only and thus enables more space for a drive unit mounted at the front of an e-axle.

These solutions often use a stabilizer bar or beam constituting both torque rod and stabilizer functions as well as carrying the vertical load from the air springs.

A problem with these solutions is that the stabilizing function is very roll stiff and does not allow the lateral movement a high positioned roll center imposes.

This can have a negative impact on mobility (traction), vehicle comfort and handling.

It is thus desired to achieve further developments for improving vehicle driving behaviour and comfort onboard the vehicle during transportation.

SUMMARY

It is therefore an object of this invention to provide an improved suspension for a vehicle, and a vehicle comprising an improved suspension.

According to a first aspect of the invention, this objective is achieved by a four point link suspension for a vehicle. The four point link suspension comprises a first side suspension spring, configured to absorb a vertical load and a second side suspension spring, configured to absorb the vertical load; wherein the first side suspension spring and the second side suspension spring are configured to be connected to a vehicle frame of the vehicle. The four point link suspension also comprises a stabilization frame, which comprises a first side link arm having a first ending comprising a first joint to a first side vehicle frame and a second ending connected to the first side suspension spring via a second joint. The stabilization frame also comprises a second side link arm having a first ending comprising a first joint for connecting a second side vehicle frame and a second ending connected to the second side suspension spring via a second joint. The stabilization frame furthermore comprises a torsion bar, connecting the first side link arm and the second side link arm.

Each of the first side link arm and the second side link arm is tapered towards the respective first ending.

Thanks to the described aspects, by tapering the side link arms towards the respective first ending, various lateral and twisting movements are managed better than according to prior art solutions. Thereby an improved vehicle suspension is achieved, having conditions for a reduced transfer of forces and vibration caused by undulations in the road surface, such as bumps or corrugations, to the vehicle frame and thereby also to the driver, passengers and/or cargo, which provides conditions for an enhanced comfort for driver and/or passengers of the vehicle during propulsion.

In case the vehicle is transporting cargo, the improved vehicle suspension may prevent the cargo from dislocation (which may cause a traffic accident) and/or from becoming damaged. In case the vehicle is transporting passengers, such as a public transportation vehicle/bus, the improved vehicle suspension may prevent passengers from falling and/or hurting themselves.

A smooth and convenient vehicle suspension also provides ergonomical advantages for the driver, leading to elimination or at least reduction of musculoskeletal disorder of the driver, and generally to a safer vehicle. Driver fatigue on long journeys may be eliminated or at least reduced, which improves traffic safety.

The improved vehicle suspension may also enable the driver to pass curves and road irregularities at higher speed than otherwise, yet being in full control of the vehicle, thereby reducing transportation time of the vehicle to the destination.

Optionally, the tapering towards the respective first ending of the first side link arm and the second side link arm may comprise reduction of a vertical extension dimension of the side link arms, from a first vertical extension dimension at the respective second ending of the first side link arm and the second side link arm, to a second vertical extension dimension at the respective first ending of the first side link arm and the second side link arm. The second vertical extension dimension may be within a range of 40-90% of the first vertical extension dimension, or within a range of 50-80% of the first vertical extension dimension.

By reducing the vertical extension dimension of the side link arm towards the second ending of the side link arms, the suspension properties of the four point link suspension is further improved.

Optionally, the side link arms may comprise a respective connection arrangement configured to connect a vehicle axle of the vehicle to the side link arms. A first distance between the respective side link arms at the connection arrangement may be longer than a second distance between the respective side link arms at the first ending of the side link arms.

An advantage by the provided design of the side link arms is that side movements and twisting movements that an axle roll with a high roll center imposes. Also, under-steering behaviour of the vehicle comprising the suspension is increased, leading to improved driving properties due to calm and predictable driving behaviour of the vehicle during propulsion.

Optionally, the second distance may be within a range of 70-99% of the first distance, or within a range of 90-97% of the first distance, as has been observed by the inventors as particularly advantageous when it comes to suspension and under-steering behaviour of a vehicle comprising the four point link suspension.

Optionally, the tapering towards the respective first ending of the first side link arm and the second side link arm may comprise reduction of a lateral extension dimension of the side link arms, from a first lateral extension dimension at the respective second ending, to a second lateral extension dimension at the respective first ending, wherein the second lateral extension dimension is shorter than first lateral extension dimension.

By reducing the lateral extension dimension of the respective side link arms towards the respective second ending, an enhanced flexibility, i.e., improved capacity for lateral movements is achieved, which enable an improved handling of lateral and twisting movements of the suspension. Thereby, also the driving properties of the vehicle comprising the suspension are improved.

Optionally, the second lateral extension dimension may be within a range of 10-50% of the first lateral extension dimension, or within a range of 20-40% of the first lateral extension dimension. These intervals have been concluded to be in particular advantageous by the inventors when it comes to improvement of driving properties of the vehicle comprising the suspension.

Optionally, the second vertical extension dimension at the first ending of the side link arms may be longer than the second lateral extension dimension at the respective first ending of the side link arms.

Hereby, the side link arms are enabled the suspension to handle and absorb heavy vertical loads, while enabling suspension of rolling/twisting movements by lateral flexibility.

Optionally, the second vertical extension dimension may be within a range of 200-2 000%, or within a range of 400-1 000% of the second lateral extension dimension of the respective side link arm at the respective first ending. These intervals have been concluded to be in particular advantageous by the inventors when it comes to improvement of suspension behaviour during load.

Optionally, each of the first side link arm and the second side link arm may be configured to allow lateral movements of the respective side link arms with a distance which is at least double as long as the second lateral extension dimension of the respective side link arm at the respective first ending.

By enabling lateral movement displacements of the side link arms, the capacity of the side link arms to absorb twisting and rolling movements is improved. Driving properties of the vehicle are improved and vehicle comfort is enhanced, which in turn may reduce accident probability. Also, a richer driving experience is provided.

Optionally, the torsion bar may be extending between a first connection point of the first side link arm, and a second connection point of the second side link arm.

Thanks to the introduced torsion bar, twisting and rolling movements of the vehicle is handled.

Optionally, the first side suspension spring and the second side suspension spring may be attached to the respective second ending of the first side link arm and the second side link arm.

By attaching the suspension springs at the respective second ending of the side link arms, close to the torsion bar, vertical loads from the springs are absorbed by the stabilization frame via the side link arms.

Optionally, the connection arrangement of each respective side link arm may comprise a center positioned bearing, which may be attached in connection with a connection means, configured for fixating a vehicle axle of the vehicle to the side link arms.

It has been observed that vehicle behaviour and suspension properties are improved by the attachment of the vehicle axle to the stabilization frame via the center positioned bearing.

Optionally, each of the first side link arm and the second side link arm may be bended in a vertical extension dimension towards the respective first ending, in relation to the respective second ending.

Hereby, space is saved for vehicle components, enabling more space for surrounding objects such as e.g., a brake cylinder, etc.

Optionally, each of the side link arms may comprise a first segment comprising the respective first ending and a second segment comprising the respective second ending, wherein the respective first segment is extending substantially along a first direction and the respective second segment is extending substantially along a second direction, wherein the first direction and the second direction are deviating from each other with an angle φ within a range of 1-20 degrees, or within a range of 5-10 degrees.

These intervals have been concluded to be in particular advantageous by the inventors when it comes to improvement of suspension behaviour during load.

According to a second aspect of the invention, this objective is achieved by a vehicle comprising a four point link suspension according to the first aspect of the invention, or any optional embodiment thereof.

Thanks to the described aspects, the problems of prior art solutions involving parallelogram rear air suspension are omitted. Instead, a four point link suspension is provided, having conditions for radically improved properties concerning management of lateral and twisting movement an axle roll with a high roll center imposes, thereby improving comfort onboard the vehicle.

A compact suspension is hereby obtained capable of providing protection for sensitive ingoing components as for example the air springs, but also provides space which enable implementation of an e-axle with a front mounted drive unit.

Also, under-steer behaviour of the vehicle having the four point link suspension can be achieved, leading to improved directional stability, such as driving experience when changing driving lanes etc., in particular when driving in highway speed.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a four point link suspension and a vehicle comprising the four point link suspension, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
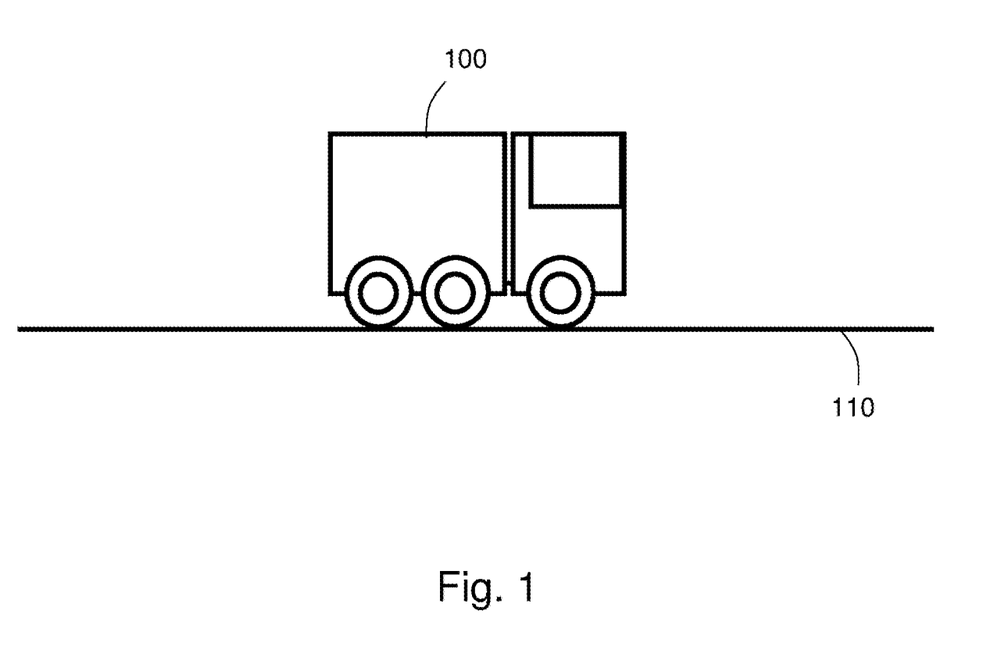
FIG. 1 schematically illustrates a vehicle according to an embodiment of the invention.

FIG. 1 schematically illustrates a vehicle 100 driving on a road segment 110.

Practicality, performance and comfort of the vehicle 100 are affected by a suspension arrangement of the vehicle 100, in particular when passing a height irregularity of the road 100 such as e.g. a speed bump, a sidewalk curb or other object protruding from the road surface; and/or a cross road where the cross roads has different inclinations. However, the height irregularity may also comprise a cavity in the road surface, such as a hole, or a cluster of holes.

According to the illustrated embodiments, the vehicle 100 is a truck. According to further embodiments, the vehicle 100, as referred to herein, may be another type of heavy or lighter type of vehicle, such as a bus, a lorry, a car, a trailer, or other similar manned or unmanned means of conveyance running on wheels. In some embodiments, the vehicle 100 may be driver controlled or driverless (i.e., autonomously controlled) in different embodiments.

The illustrated vehicle 100 of FIG. 1 has three axles. However, other embodiments of the vehicle 100 may have a rear bogie axle, two axles, four axles, five axles, etc. Further, the vehicle 100 may comprise a trailer; and/or an articulated/bi-articulated vehicle 100, etc.

The vehicle 100 comprises a four point link suspension according to any embodiment as illustrated in any one of the FIGS. 2A-4B, and/or discussed in the corresponding section of the description.

Figure 2A:
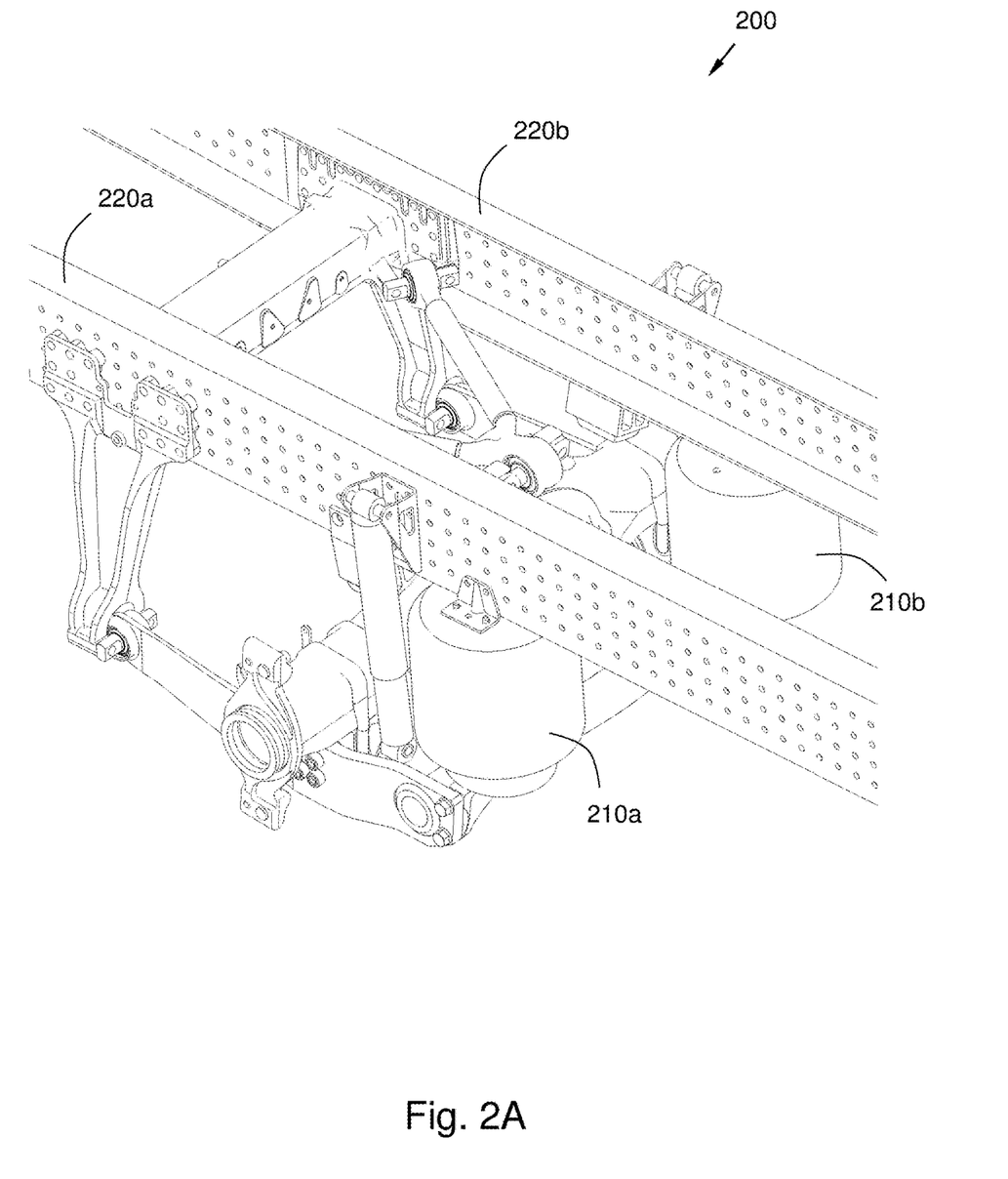
FIG. 2A illustrates an embodiment of a four point link suspension and a section of a vehicle frame.

FIG. 2A illustrates a four point link suspension 200, sometimes also referred to as a parallelogram wheel suspension. The four point link suspension 200 is intended for usage in a vehicle 100, in particular for a rear wheel axle of the vehicle 100.

Figure 2B:
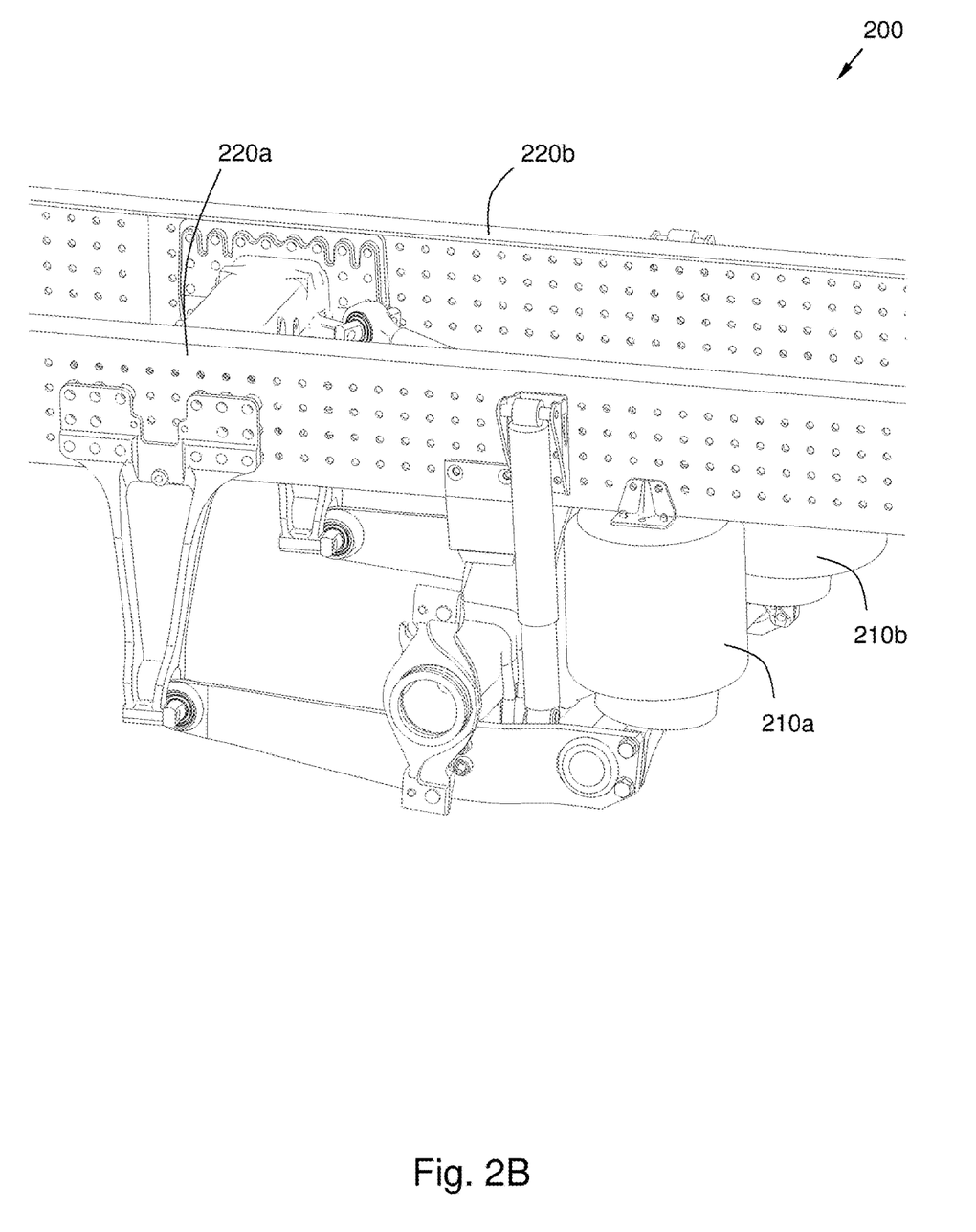
FIG. 2B illustrates an embodiment of a four point link suspension and a section of a vehicle frame.
Figure 2C:
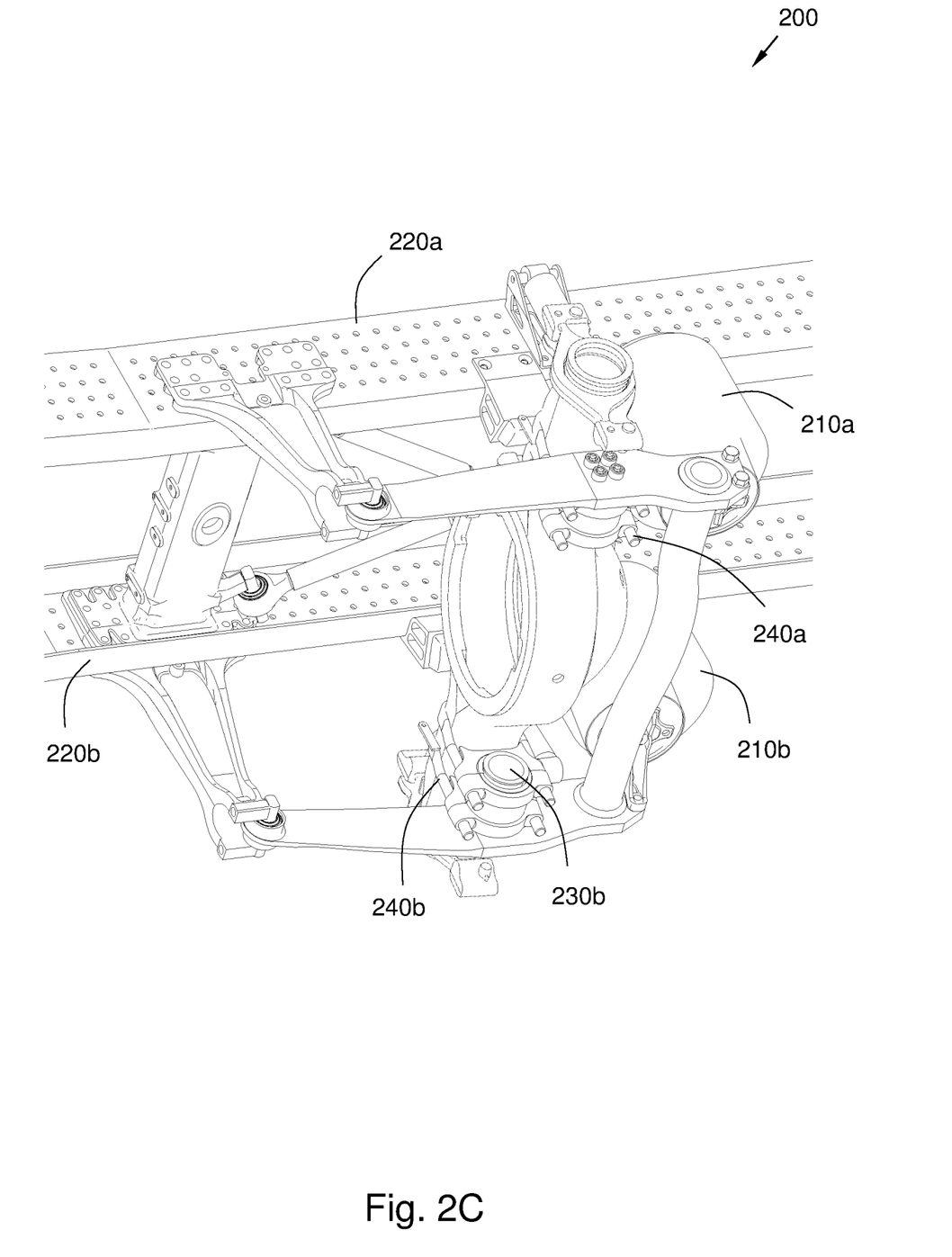
FIG. 2C illustrates an embodiment of a four point link suspension and a section of a vehicle frame.
Figure 3A:
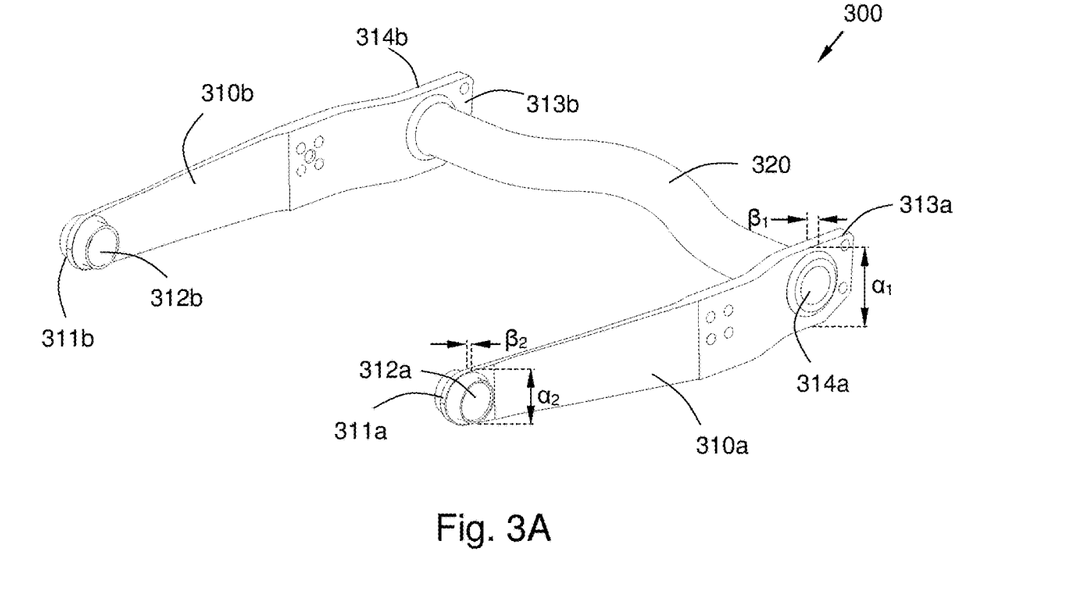
FIG. 3A illustrates a stabilization frame of a four point link suspension according to an embodiment of the invention.
Figure 3B:
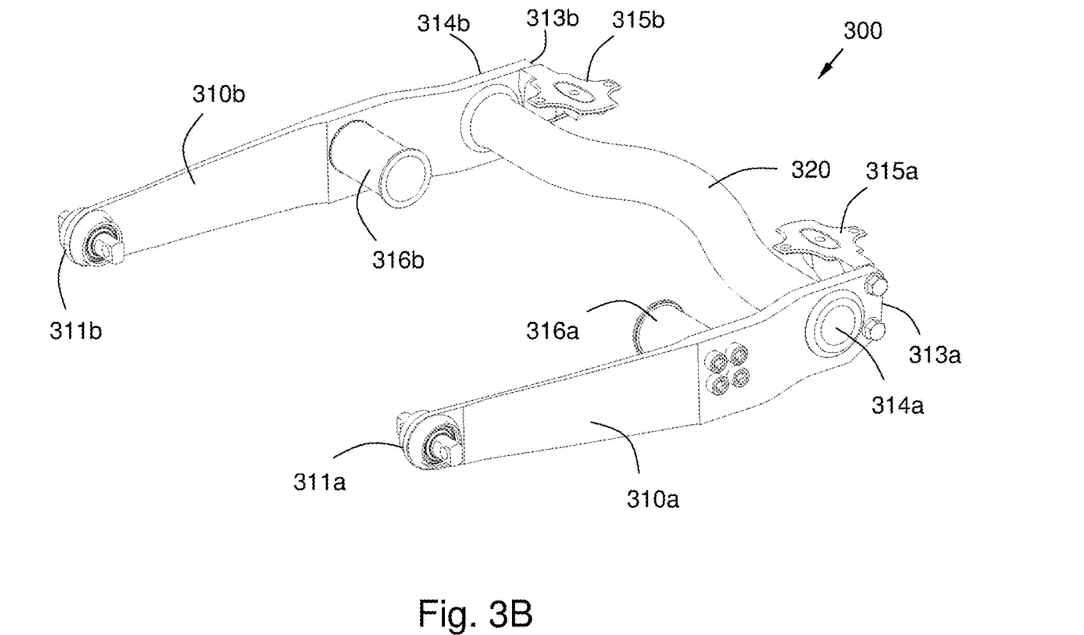
FIG. 3B illustrates a stabilization frame of a four point link suspension according to an embodiment of the invention.
Figure 3C:
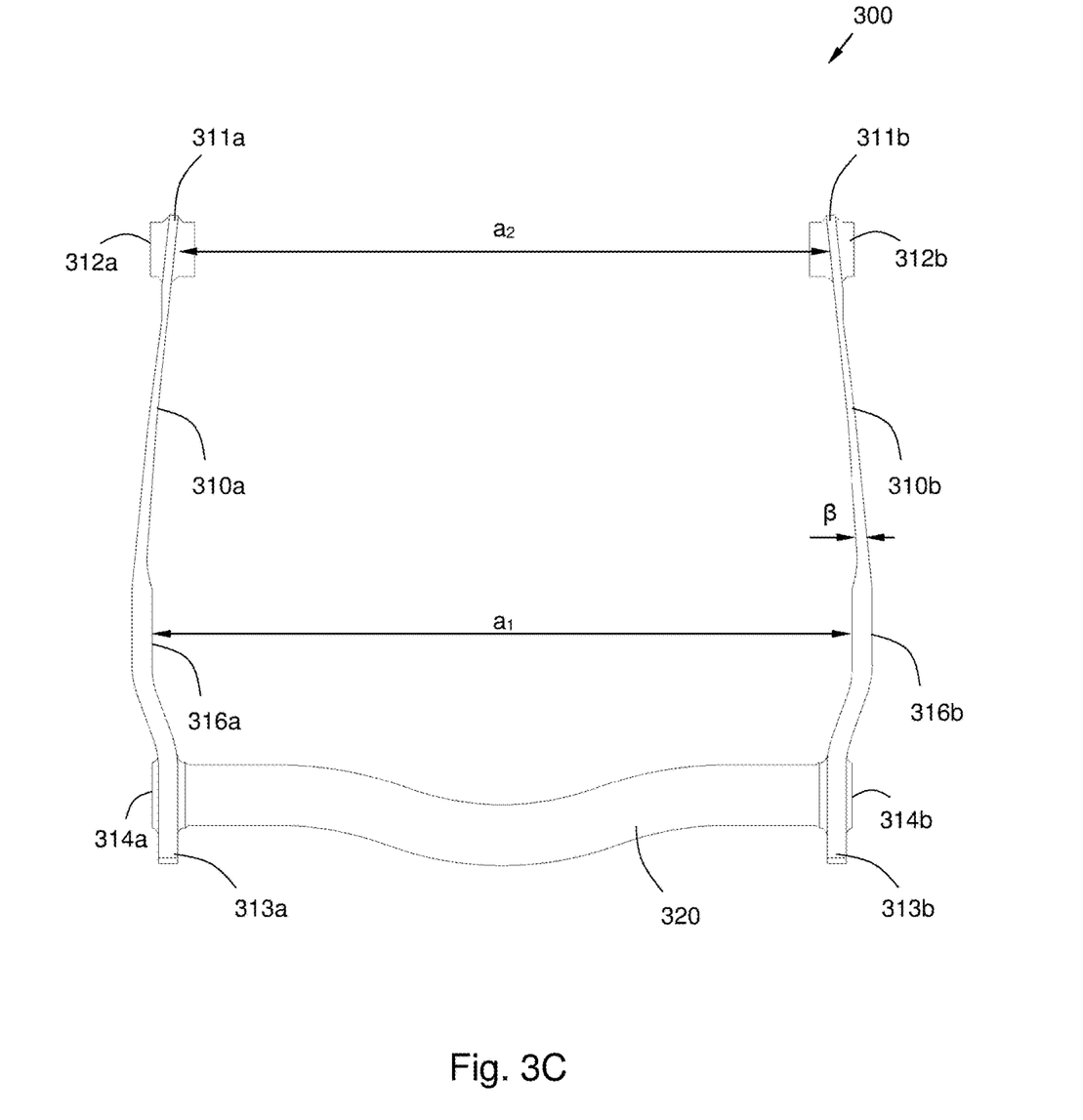
FIG. 3C illustrates a stabilization frame of a four point link suspension according to an embodiment of the invention.

The illustrations of FIGS. 2A-2C are depicting examples of how the four point link suspension 200 according to some embodiments be implemented in the vehicle 100, while details of the four point link suspension 200 and in particular the therein comprised stabilization frame are illustrated in FIGS. 3A-3C.

The four point link suspension 200 comprises a first side suspension spring 210a, and a second side suspension spring 210b. The side suspension springs 210a, 210b may comprise air springs/pneumatic springs. However, in alternative embodiments, the side suspension springs 210a, 210b may comprise torsion springs, hydropneumatics springs, coil springs, leaf springs, etc., in different embodiments.

The first side suspension spring 210a, and a second side suspension spring 210b are configured to absorb a substantially vertical load of the four point link suspension 200. The suspension springs 210a, 210b may be height adjustable in some embodiments.

The first side suspension spring 210a and the second side suspension spring 210b are configured to be connected to a vehicle frame 220a, 220b of the vehicle 100 for example by an appropriate fastener such as threaded fastener involving a nut and a bolt, and possibly also involving washers. In other embodiments, the fastening may be made semi-permanent by means of a rivet, or even permanently by means of welding, gluing, etc.

The set of suspension springs 210a, 210b, of the vehicle 100 may comprise any of the frontal suspension springs of the vehicle 100, and/or the rear suspension springs of the vehicle 100, in different embodiments. Possibly in some alternative embodiments, one separate four point link suspension 200 may be applied for each of the sets of springs.

FIG. 2B illustrates a four point link suspension 200, as regarded in a side view.

The first side link arm and the second side link arm of the stabilization frame are connected to the vehicle frame 220a, 220b of the vehicle 100, via a first joint and possibly an extension part of the vehicle frame 220a, 220b, and also connected to the side suspension springs 210a, 210b. In the illustrated embodiment, the vehicle frame 220a, 220b comprises two beams arranged parallel to a longitudinal direction of the vehicle 100.

In the illustrated embodiment, a respective frontal section of the first side link arm and the second side link arm of the stabilization frame are connected to the vehicle frame 220a, 220b while a rear section of the first side link arm and the second side link arm are connected via the side suspension springs 210a, 210b to the vehicle frame 220a, 220b.

Also, the first side link arm is connected to the second side link arm via a torsion bar, which together are forming the stabilization frame, as may be seen in FIG. 2C.

A vehicle axle of the vehicle 100 may be connected to the first and second side link arms of the stabilization frame via connection means 240a, 240b connected to the respective side link arms via center positioned bearing 230a, 230b.

FIG. 3A illustrates a stabilization frame 300 in an embodiment. The stabilization frame 300 comprises a first side link arm 310a, a second side link arm 310b and a torsion bar 320, connecting the first side link arm 310a and the second side link arm 310b.

The first side link arm 310a has a first ending 311a comprising a first joint 312a to the first side vehicle frame 220a. The first side link arm 310a also has a second ending 313a connected to the first side suspension spring 210a via a second joint 315a, as illustrated in FIG. 3B.

The second side link arm 310b has a first ending 311b comprising a first joint 312b for connecting a second side vehicle frame 220b. Also, the second side link arm 310b has a second ending 313b connected to the second side suspension spring 210b via a second joint 315b.

The first side link arm 310a and the second side link arm 310b are both tapered towards the respective first ending 311a, 311b.

The tapering towards the first ending 311a of the first side link arm 310a, and the first ending 311b of the second side link arm 310b may comprise a reduction of a vertical extension dimension of the respective side link arms 310a, 310b. The reduction of the vertical extension dimension of the side link arms 310a, 310b may be made from a first vertical extension dimension $\alpha_1$ at the respective second ending 313a, 313b of the first side link arm 310a and the second side link arm 310b, to a second vertical extension dimension $\alpha_2$ at the respective first ending 311a, 311b of the first side link arm 310a and the second side link arm 310b.

In some embodiments, the second vertical extension dimension $\alpha_2$ may be within a range of about 40-90%, or within a range of 50-80% of the first vertical extension dimension $\alpha_1$.

FIG. 3C illustrates a stabilization frame 300 in an embodiment as regarded in a top view.

The side link arms 310a, 310b of the stabilization frame 300 may comprise a respective connection arrangement 316a, 316b. The connection arrangement 316a, 316b may be configured to connect a vehicle axle of the vehicle 100 to the first and second side link arms 310a, 310b and thereby also the stabilization frame 300 and the four point link suspension 200.

In particular, a rear axle of the vehicle 100 may be connected to the four point link suspension 200 in some optional embodiments.

The first side link arm 310a and the second side link arm 310b may be shaped and positioned in relation to each other, such that a first distance $a_1$ between the respective side link arms 310a, 310b at the connection arrangement 316a, 316b is longer than a second distance $a_2$ between the respective side link arms 310a, 310b at the first ending 311a, 311b of the side link arms 310a, 310b.

It has been observed that the design of the stabilization frame 300, wherein the distance $a_2$ between the respective side link arms 310a, 310b at the first ending 311a, 311b of the side link arms 310a, 310b is smaller than the distance $a_1$ between the respective side link arms 310a, 310b at the connection arrangement 316a, 316b is increasing understeer behaviour, leading to an improved driver experience of the vehicle 100.

The second distance $a_2$ may be within a range of 70-99%, or within a range of 90-97% of the first distance $a_1$ in order to achieve/increase the desired understeer behaviour.

Also, drum brake cylinders and an E-drive unit may utilize the space between the rear segment of the side link arms 310a, 310b at the connection arrangement 316a, 316b. The e-axle, or e-drive, combines an electric vehicle's gear, motor, and power-control electronics in one compact unit at the axle of battery-electric vehicles/hybrid vehicles.

The tapering towards the first ending 311a of the first side link arm 310a and the first ending 311b of the second side link arm 310b may also, or in addition comprise reduction of a lateral extension dimension of the side link arms 310a, 310b. The lateral extension dimension of the side link arms 310a, 310b may be referred to as thickness of the side link arms 310a, 310b. The thickness may be tapered from a first lateral extension dimension $\beta_1$ at the respective second ending 313a, 313b, to a second lateral extension dimension $\beta_2$ at the respective first ending 311a, 311b, wherein the second lateral extension dimension $\beta_2$ is shorter than first lateral extension dimension $\beta_1$; i.e. the side link arms 310a, 310b may be thinner closer to the respective first ending 311a, 311b than at the respective second ending 313a, 313b.

The second lateral extension dimension $\beta_2$ may be within a range of 10-50%, or within a range of 20-40% of the first lateral extension dimension $\beta_1$.

The side link arms 310a, 310b may alternatively be referred to as blades. The second vertical extension dimension $\alpha_2$, or height, at the first ending 311a, 311b of the side link arms 310a, 310b may be longer than the second lateral extension dimension $\beta_2$, or thickness of the side link arms 310a, 310b at the respective first ending 311a, 311b of the side link arms 310a, 310b.

The second vertical extension dimension $\alpha_2$ may in optional embodiments be within a range of 200-2 000%, or within a range of 400-1 000% of the second lateral extension dimension $\beta_2$ of the respective side link arm 310a, 310b at the respective first ending 311a, 311b.

Each of the first side link arm 310a and the second side link arm 310b may be configured to allow lateral movements of the respective side link arms 310a, 310b with a distance which is at least double as long as the second lateral extension dimension $\beta_2$ of the respective side link arm 310a, 310b at the respective first ending 311a, 311b.

The lateral movements, which is enabled by the tapering of the side link arms 310a, 310b, lateral and twisting movements of the vehicle 100 is handled.

The torsion bar 320 may extend between a first connection point 314a of the first side link arm 310a, and a second connection point 314b of the second side link arm 310b. The torsion bar 320 may be straight in some embodiments, thereby effectively transferring torsion movements between the side link arms 310a, 310b. In some embodiments (as illustrated in FIGS. 3A-3C), the torsion bar 320 may be somewhat curved backwards and/or upwards here so as not to restrict the ground clearance and to move freely from various components of the vehicle axle.

The first side suspension spring 210a and the second side suspension spring 210b may be attached to the respective second ending 313a, 313b of the first side link arm 310a and the second side link arm 310b via a respective joint 315a, 315b.

Hereby, vertical load of the vehicle 100 is transferred via the suspension springs 210a, 210b to the stabilization frame 300. Thus, the torsion bar 320 both provides a stabilizing function as well as carrying the vertical load.

The connection arrangement 316a, 316b of each respective side link arm 310a, 310b may comprise a center positioned bearing 230a, 230b, which may be attached in connection with a connection means 240a, 240b, configured for fixating a vehicle axle of the vehicle 100 to the first and second side link arms 310a, 310b.

Figure 4A:
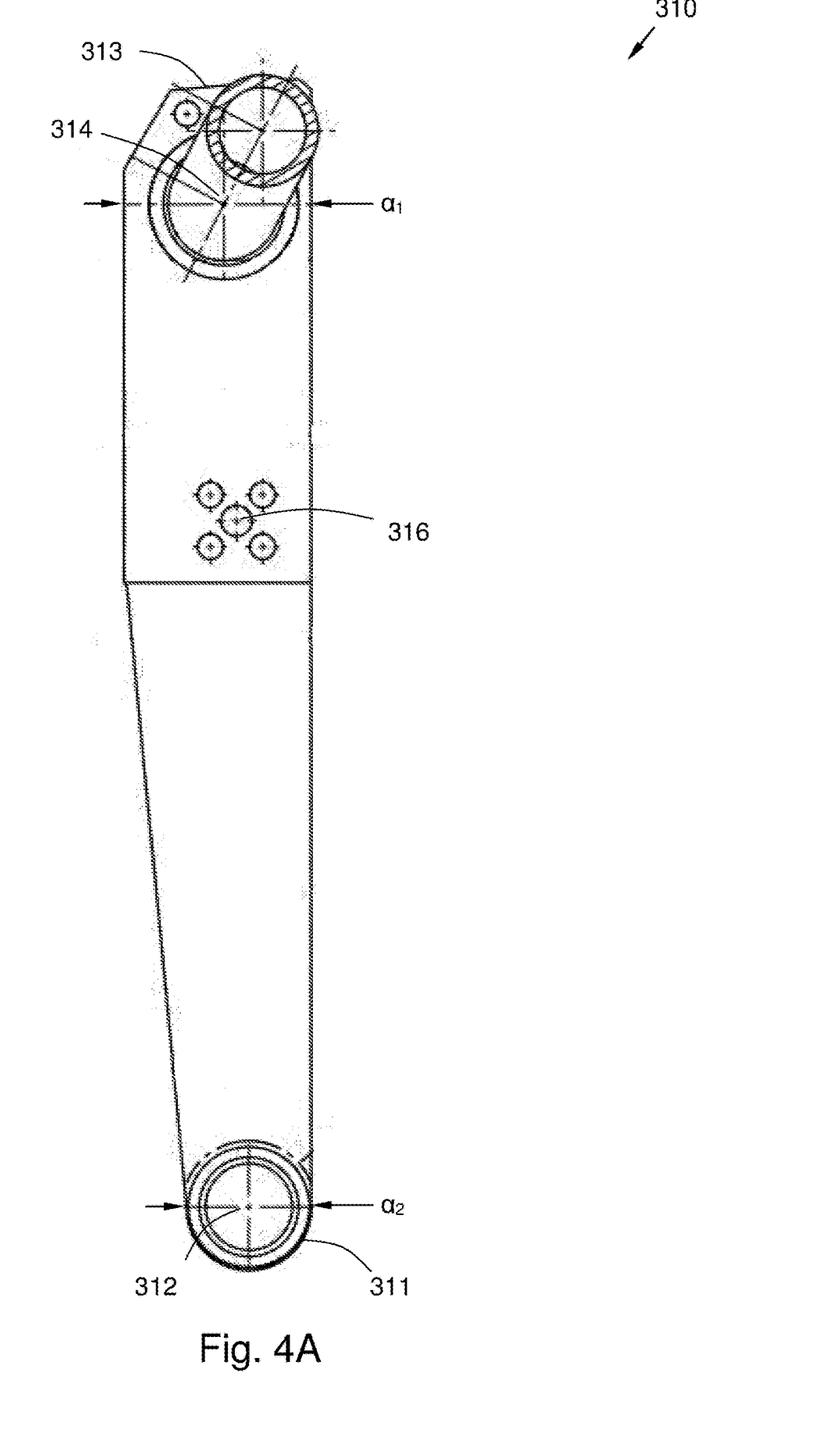
FIG. 4A illustrates a side link arm of a stabilization frame according to an embodiment of the invention.
Figure 4B:
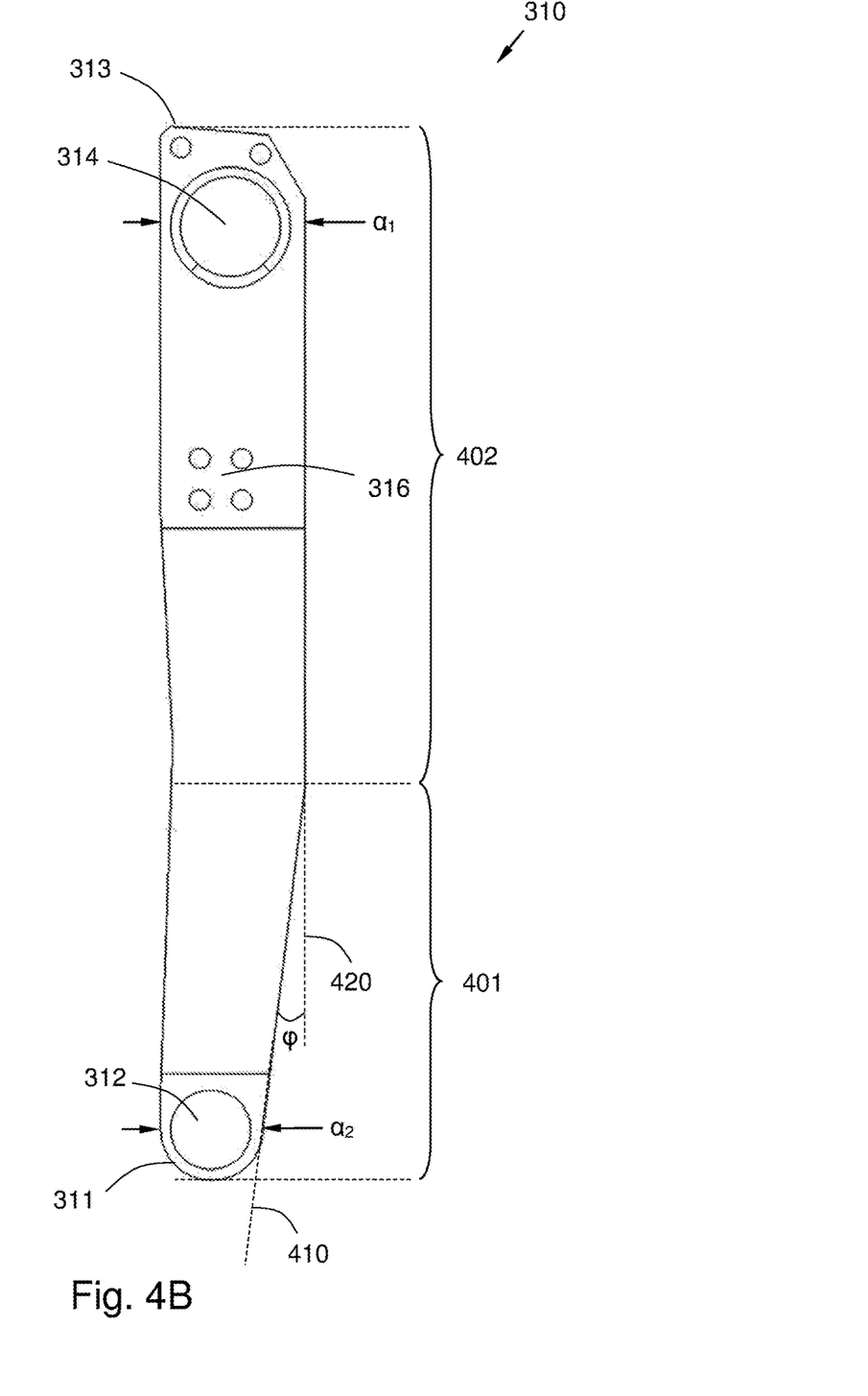
FIG. 4B illustrates a side link arm of a stabilization frame according to an embodiment of the invention.

FIG. 4A and FIG. 4B illustrate different embodiments of the side link arms 310a, 310b. The side link arm 310 illustrated in FIG. 4A is straight yet tapered while the side link arm 310 according to the alternative embodiment illustrated in FIG. 4B is bent, e.g., bent-shaped or banana shaped in a substantially vertical plane. The bending may be made in a vertical extension dimension of the side link arm 310, towards the respective first ending 311a, 311b, in relation to the respective second ending 313a, 313b.

Each of the side link arms 310a, 310b may comprise a first segment 401 wherein the respective first ending 311a, 311b may be comprised. Also, each of the side link arms 310a, 310b may comprise a second segment 402 comprising the respective second ending 313a, 313b of the corresponding side link arm 310a, 310b.

The respective first segment 401 of the side link arms 310a, 310b may extend substantially along a first direction 410 and the respective second segment 402 may extend substantially along a second direction 420.

In the illustrated embodiment, the first direction 410 and the second direction 420 are deviating from each other with an angle $\varphi$ of approximately in between 5-10 degrees, or about 7 degrees. According to further embodiments, the first direction 410 and the second direction 420 may be deviating from each other with an angle $\varphi$ within a range of 1-20 degrees, or within a range of 5-10 degrees, in some alternative embodiments.

The side link arms 310a, 310b may comprise a bent section in between the first segment 401 and the second segment 402. In the illustrated embodiment, bent section is bent with an angle $\varphi$ of approximately about 7 degrees. However, according to further embodiments, the bent section may be bent with an angle $\varphi$ within the range of 1-20 degrees, or within the range of 5-10 degrees.

The terminology used in the description of the embodiments as illustrated in the accompanying drawings is not intended to be limiting of the described four point link suspension 200 and/or vehicle 100. Various changes, substitutions and/or alterations may be made, without departing from invention embodiments as defined by the appended claims.

The first and second vertical extension dimensions $\alpha_1$, $\alpha_2$ may each be measured in a direction parallel to a vertical direction of the vehicle 100 comprising the four point link suspension 200. The vertical direction of the vehicle 100 is perpendicular to a flat horizontal support surface when the vehicle 100 is positioned in an upright use position onto the flat horizontal support surface. In other words, the vertical direction of the vehicle 100 is parallel to a surface normal of the flat horizontal support surface when the vehicle 100 is positioned in the upright use position onto the flat horizontal support surface. Wheels of the vehicle 100 are abutting against the flat horizontal support surface when the vehicle 100 is positioned in the upright use position onto the flat horizontal support surface.

The vehicle 100 comprises a longitudinal direction. The longitudinal direction is parallel to the flat horizontal support surface when the vehicle 100 is positioned in the upright use position onto the flat horizontal support surface. The longitudinal direction of the vehicle 100 coincides with a forward and reverse driving direction of the vehicle 100. The vehicle 100 also comprises a lateral direction. The lateral direction is perpendicular to the longitudinal direction and is perpendicular to the vertical direction of the vehicle 100. In other words, the lateral direction of the vehicle 100 is parallel to a flat horizontal support surface when the vehicle 100 is positioned in an upright use position onto the flat horizontal support surface.

The first and second lateral extension dimensions $\beta_1$, $\beta_2$ may each be measured in a direction parallel the lateral direction of the vehicle 100 comprising the four point link suspension 200.

The term "lateral movements" as used herein refers to movements in directions parallel to the lateral direction of the vehicle 100 comprising the four point link suspension 200.

The term "vertical load" as used herein refers to a load acting in a direction parallel to the vertical direction of the vehicle 100 comprising the four point link suspension 200.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. The mere fact that certain measures are recited in mutually different dependent claims does not indicate that a combination of these measures cannot be used to advantage.

The invention claimed is:

1. A four point link suspension for a vehicle, wherein the four point link suspension comprises:
   first and second side suspension springs, each configured to absorb a vertical load, wherein the first side suspension spring and the second side suspension spring are configured to be connected to a vehicle frame of the vehicle;
   a stabilization frame, comprising:
      a first side link arm comprising a first segment having a first ending comprising a first joint for connecting to a first side vehicle frame and a second segment adjacent the first segment of the first side link arm and having a second ending comprising a second joint for connecting to the first side suspension spring;
      a second side link arm comprising a first segment having a first ending comprising a first joint for connecting to a second side vehicle frame and a second segment adjacent the first segment of the second side link arm and having a second ending comprising a second joint for connecting-connected to the second side suspension spring;
a torsion bar, connecting the first side link arm and the second side link arm; and
a connection arrangement located on each of the second segments of the first and second side link arms spaced apart from the respective second endings and configured to connect a vehicle axle of the vehicle to the first and second side link arms,
wherein the first segments of each of the first and second side link arms are angled toward each other relative to the location of the connection arrangement and the second segments of each of the first and second side link arms are angled toward each other relative to the location of the connection arrangement, such that a first distance between the respective side link arms at the connection arrangement is longer than both: (i) a second distance between the respective first endings of the first and second side link arms and (ii) a third distance between the respective second endings of the first and second side link arms.

2. The four point link suspension according to claim 1, wherein each of the first side link arm and the second side link arm is tapered towards the respective first ending, and wherein the tapering towards the respective first ending of the first side link arm and the second side link arm comprises reduction of a vertical extension dimension of the first and second side link arms, from a first vertical extension dimension at the respective second ending of the first side link arm and the second side link arm, to a second vertical extension dimension at the respective first ending of the first side link arm and the second side link arm, wherein the second vertical extension dimension is within one of: a range of 40-90%, or within a range of 50-80% of the first vertical extension dimension.

3. The four point link suspension according to claim 1, wherein the second distance is within one of: a range of 70-99%, or within a range of 90-97% of the first distance.

4. The four point link suspension according to claim 1, wherein each of the first side link arm and the second side link arm is tapered towards the respective first ending, and wherein the tapering towards the respective first ending of the first side link arm and the second side link arm comprises reduction of a lateral extension dimension of the first and second side link arms, from a first lateral extension dimension at the respective second ending, to a second lateral extension dimension at the respective first ending, wherein the second lateral extension dimension at the first ending is shorter than a first lateral extension dimension at the respective second ending.

5. The four point link suspension according to claim 4, wherein the second lateral extension dimension is within one of: a range of 10-50%, or within a range of 20-40% of the first lateral extension dimension.

6. The four point link suspension according to claim 1, wherein each of the first side link arm and the second side link arm is configured to allow lateral movements of the respective first and second side link arms within a distance which is at least double as long as a lateral extension dimension of the respective side link arm at the respective first ending.

7. The four point link suspension according to claim 1, wherein the first side suspension spring and the second side suspension spring are attached to the respective second ending of the first side link arm and the second side link arm.

8. The four point link suspension according to claim 1, wherein the connection arrangement of each respective side link arm comprises a center positioned bearing, which is attached in connection with a connection means, configured for fixating a vehicle axle of the vehicle to the first and second side link arms.

9. The four point link suspension according to claim 1, wherein each of the first side link arm and the second side link arm is bent in a vertical extension dimension.

10. The four point link suspension according to claim 1, wherein the respective first segment of each of the first and second side link arms extends substantially along a first direction and the respective second segment of each of the first and second side link arms extends substantially along a second direction, wherein the first direction and the second direction are deviating from each other with an angle greater than 0 degrees.

11. A vehicle comprising:
a vehicle frame; and
a four point link suspension comprising:
first and second side suspension springs, each configured to absorb a vertical load, wherein the first side suspension spring and the second side suspension spring are configured to be connected to the-vehicle frame;
a stabilization frame, comprising:
a first side link arm comprising a first segment having a first ending comprising a first joint for connecting to a first side vehicle frame and a second segment adjacent the first segment of the first side link arm and having a second ending comprising a second joint for connecting to the first side suspension spring;
a second side link arm comprising a first segment having a first ending comprising a first joint for connecting to a second side vehicle frame and a second segment adjacent the first segment of the second side link arm and having a second ending comprising a second joint for connecting to the second side suspension spring;
a torsion bar, connecting the first side link arm and the second side link arm; and
a connection arrangement located on each of the second segments of the first and second side link arms spaced apart from the respective second endings and configured to connect a vehicle axle of the vehicle to the first and second side link arms,
wherein the first segments of each of the first and second side link arms are angled toward each other relative to the location of the connection arrangement and the second segments of each of the first and second side link arms are angled toward each other relative to the location of the connection arrangement, such that a first distance between the respective side link arms at the connection arrangement is longer than both: (i) a second distance between the respective first endings of the first and second side link arms and (ii) a third distance between the respective second endings of the first and second side link arms; and
wherein the vehicle frame is configured to be connected to the first side suspension spring and the second side suspension spring of the four point link suspension, and also configured to be connected to the first side link arm and the second side link arm.

12. The four point link suspension according to claim 10, wherein the first direction and the second direction are deviating from each other with an angle within a range of one of: 1-20 degrees, or within a range of 5-10 degrees.

13. The four point link suspension according to claim 1, wherein each of the first side link arm and the second side link arm is tapered towards the respective first ending, wherein the tapering towards the respective first ending of the first side link arm and the second side link arm comprises:
reduction of a vertical extension dimension of the first and second side link arms, from a first vertical extension dimension at the respective second ending of the first side link arm and the second side link arm, to a second vertical extension dimension at the respective first ending of the first side link arm and the second side link arm, and
reduction of a lateral extension dimension of the first and second side link arms, from a first lateral extension dimension at the respective second ending, to a second lateral extension dimension at the respective first ending, wherein the second lateral extension dimension is shorter than first lateral extension dimension.

14. The four point link suspension according to claim 13, wherein each of the first side link arm and the second side link arm is bent in a vertical extension dimension.

15. The four point link suspension according to claim 13, wherein each of the first and second side link arms comprises a first segment comprising the respective first ending and a second segment comprising the respective second ending, wherein the respective first segment is extending substantially along a first direction and the respective second segment is extending substantially along a second direction, wherein the first direction and the second direction are deviating from each other with an angle greater than 0 degrees.

16. The four point link suspension according to claim 1, wherein each of the first and second side link arms comprise a continuous reduction of a lateral extension dimension of the first segments, from a first lateral extension dimension adjacent the respective second segments to a second lateral extension dimension at the respective first ending, wherein the second lateral extension dimension is shorter than first lateral extension dimension.

17. A four point link suspension for a vehicle, wherein the four point link suspension comprises:
first and second side suspension springs, each configured to absorb a vertical load, wherein the first side suspension spring and the second side suspension spring are configured to be connected to a vehicle frame of the vehicle;
a stabilization frame, comprising:
a first side link arm having a first ending comprising a first joint for connecting to a first side vehicle frame and a second ending comprising a second joint for connecting to the first side suspension spring;
a second side link arm comprising a first segment having a first ending comprising a first joint for connecting to a second side vehicle frame and a second segment adjacent the first segment of the second side link arm and having a second ending comprising a second joint for connecting to the second side suspension spring;
a torsion bar, connecting the first side link arm and the second side link arm; and
a connection arrangement located on each of the first and second side link arms and configured to connect a vehicle axle of the vehicle to the first and second side link arms, and
wherein each of the first side link arm and the second side link arm is tapered towards the respective first ending, and wherein the tapering towards the respective first ending of the first side link arm and the second side link arm comprises reduction of a lateral extension dimension of the first and second side link arms, from a first lateral extension dimension at the respective second ending, to a second lateral extension dimension at the respective first ending, wherein the second lateral extension dimension at the first ending is shorter than a first lateral extension dimension at the respective second ending.

18. The four point link suspension according to claim 17, wherein a first distance between the respective first and second side link arms at the connection arrangement is longer than a second distance between the respective side link arms at the first ending of the side link arms.

19. A four point link suspension for a vehicle, wherein the four point link suspension comprises:
first and second side suspension springs, each configured to absorb a vertical load, wherein the first side suspension spring and the second side suspension spring are configured to be connected to a vehicle frame of the vehicle;
a stabilization frame, comprising:
a first side link arm having a first ending comprising a first joint for connecting to a first side vehicle frame and a second ending comprising a second joint for connecting to the first side suspension spring;
a second side link arm having a first ending comprising a first joint for connecting to a second side vehicle frame and a second ending comprising a second joint for connecting to the second side suspension spring;
a torsion bar, connecting the first side link arm and the second side link arm; and
a connection arrangement located on each of the respective first and second link arms and configured to connect a vehicle axle of the vehicle to the first and second side link arms,
wherein each of the first side link arm and the second side link arm is tapered towards the respective first ending, wherein the tapering towards the respective first ending of the first side link arm and the second side link arm comprises:
reduction of a vertical extension dimension of the first and second side link arms, from a first vertical extension dimension at the respective second ending of the first side link arm and the second side link arm, to a second vertical extension dimension at the respective first ending of the first side link arm and the second side link arm, and
reduction of a lateral extension dimension of the first and second side link arms, from a first lateral extension dimension at the respective second ending, to a second lateral extension dimension at the respective first ending, wherein the second lateral extension dimension is shorter than first lateral extension dimension.

20. The four point link suspension according to claim 19, wherein a first distance between the respective first and second side link arms at the connection arrangement is longer than a second distance between the respective side link arms at the first ending of the side link arms.

21. The four point link suspension according to claim 19, wherein the vertical extension dimension at the first ending of the first and second side link arms is longer than the lateral extension dimension at the respective first ending of the first and second side link arms.

22. The four point link suspension according to claim 21, wherein the vertical extension dimension is within one of: a range of 200-2,000%, or within a range of 400-1,000% of the lateral extension dimension of the respective side link arm at the respective first ending.

23. The four point link suspension according to claim 13, wherein the vertical extension dimension at the first ending of the first and second side link arms is longer than the lateral extension dimension at the respective first ending of the first and second side link arms.

24. The four point link suspension according to claim 23, wherein the vertical extension dimension is within one of: a range of 200-2,000%, or within a range of 400-1,000% of the lateral extension dimension of the respective side link arm at the respective first ending.

\* \* \* \* \*